(12) United States Patent
Tomita

(10) Patent No.: US 6,444,999 B1
(45) Date of Patent: Sep. 3, 2002

(54) QUANTUM CIRCUIT

(75) Inventor: Akihisa Tomita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/917,759

(22) Filed: Jul. 31, 2001

(30) Foreign Application Priority Data

Jul. 31, 2000 (JP) ...................................... 2000-230366

(51) Int. Cl.$^7$ ..................... H01L 29/06; H01L 31/0328; H01L 31/0336; H01L 31/072; H01L 31/109
(52) U.S. Cl. ........................................................ 257/14
(58) Field of Search .......................................... 257/14

(56) References Cited

U.S. PATENT DOCUMENTS

| | | | | |
|---|---|---|---|---|
| 3,648,193 A | * | 3/1972 | Foster et al. ................ | 331/94.5 |
| 3,909,749 A | * | 9/1975 | Weber ........................ | 332/7.51 |
| 5,233,242 A | * | 8/1993 | Murphy et al. ............. | 307/476 |
| 5,264,711 A | * | 11/1993 | Dutta et al. .................... | 257/14 |
| 6,057,541 A | * | 5/2000 | Steenblik ..................... | 250/225 |
| 6,321,182 B1 | * | 11/2001 | Suzuki ......................... | 703/14 |

OTHER PUBLICATIONS

Scully et al., "Two–Photon Scheme for Detecting the Bell Basis Using Atomic Coherence", vol. 83, No. 21, 11/99, pp. 4433–4436.
Furusawa et al., "Unconditional Quantum Teleportation", vol. 282, 10/98, pp. 706–709.

* cited by examiner

Primary Examiner—Olik Chaudhuri
Assistant Examiner—William C. Vesperman
(74) Attorney, Agent, or Firm—Young & Thompson

(57) ABSTRACT

With the object of providing a practical quantum circuit capable of discriminating Bell states in order to realize transmission of quantum states with high fidelity, a quantum circuit comprises: a two-photon absorbing crystal that selectively absorbs, in accordance with known selection rules, a photon pair of a Bell state that is determined depending on crystal symmetry of said two-photon absorbing crystal; a two-photon absorption detector that detects absorption of photon pairs by said two-photon absorbing crystal; and a polarization element that converts the Bell state of a polarized photon pair. The two-photon absorbing crystal makes two-photon absorption of a photon pair of a specific Bell state only. Electrons that have been excited by the two-photon absorption are detected by the detector.

15 Claims, 7 Drawing Sheets

Fig. 3

|     | xx       | xy | zx       | yx | yy       | yz       | zx       | zy       | zz        |
|-----|----------|----|----------|----|----------|----------|----------|----------|-----------|
| Γ 1 | $3^{-1/2}$ | 0  | 0        | 0  | $3^{-1/2}$ | 0        | 0        | 0        | $3^{-1/2}$  |
| Γ 3 | $-6^{-1/2}$ | 0  | 0        | 0  | $-6^{-1/2}$ | 0        | 0        | 0        | $2*6^{-1/2}$ |
|     | $2^{-1/2}$ | 0  | 0        | 0  | $-2^{-1/2}$ | 0        | 0        | 0        | 0         |
|     | 0        | 0  | 0        | 0  | 0        | $2^{-1/2}$ | 0        | $2^{-1/2}$ | 0         |
| Γ 5 | 0        | 0  | $2^{-1/2}$ | 0  | 0        | 0        | $2^{-1/2}$ | 0        | 0         |
|     | $2^{-1/2}$ | 0  | $2^{-1/2}$ | 0  | 0        | 0        | 0        | 0        | 0         |

QUANTUM CIRCUIT

BACKGROUND OF THE INVENTION

The present invention relates to quantum communication and a quantum computer that employs light, and more particularly to a quantum circuit that effects measurements of quantum states.

The explosive increase in widespread use of the Internet and the practicability of electronic commerce transactions have increased the social needs for encryption technology, which includes maintenance of confidentiality of communications, prevention of forgery, and user authentication. At present, common key methods such as DES (Data Encryption Standard) codes and public key methods including RAS (Rivest, Shamir, Adleman Public Key Encryption) codes are in wide use. However, these methods are based on "safety through computational load," and current encryption methods are therefore always threatened by progress in computer hardware and code decryption algorithms.

The laws of physics, in contrast, guarantee the safety of "physical codes" such as quantum codes, and these physical codes therefore can guarantee ultimate safety that does not depend on limitations of the capabilities of computers. Putting such an encryption method into practical use would have an extremely powerful social impact, and such encryption methods are expected to become one of the technological foundations of the information industry in the future.

The transmission of quantum information, of which quantum code is representative, is limited to a distance of several tens of kilometers due to loss and disturbance of the quanta (photons) that are used in transmission. In addition, intercommunication is limited to the two ends of the optical fiber that makes the transmission path, and quantum communication with multiple partners therefore requires the establishment of a large number of optical fibers. To solve these problems and realize quantum networking that can implement quantum information communication over a wide range requires technology such as relays and exchanges. Of course, relays and exchanges can be realized by converting quantum information to classical information at a relay station, but such a solution would interrupt the advantageous properties inherent in quantum information communication. In a case in which quantum encryption keys are distributed, for example, a wire-tapper could obtain access to all information by breaking into a relay station, and the safety against wiretapping that is the advantage of quantum information would be lost.

For these reasons, there is a need for quantum relays and quantum exchanges that relay and exchange quantum information as is. Quantum relays and quantum exchanges are also vital for distributed quantum computers. The utilization of quantum teleportation by a quantum relay can realize various effects as described hereinbelow. Quantum information is carried by entangled photon pairs that imply quantum correlation and by classical information separately. When entanglement swapping is used, transmission can be implemented by swapping entangled photon pairs at successive repeaters. The sender provides the swap information to the receiver as classical information.

By means of this entanglement swapping method, the receiver and sender can share entangled photon pairs even when separated by great distances.

Quantum teleportation and entanglement swapping are predicated on the generation of entangled photon pairs and the measurement of Bell states. In Bell-state measurement, two photons are discriminated to be in one of four entangled states, referred to as Bell states. Although the principles of quantum teleportation and entanglement swapping have been confirmed through experimentation, it is not possible with the currently available technology to discriminate all of four Bell states, and transmission by any desired quantum state is therefore yet to be realized.

In Science, 282, 706 (1998), Furusawa, A. et al. reported on quantum teleportation that does not require measurement of Bell states. Although this method enables transmission in any quantum state, it entails 100% squeezing of light. However, due to the insufficient squeezing of the light source that is currently obtainable, the obtainable fidelity of the transmitted quantum states is no higher than 58%. Nevertheless, a fidelity of nearly 100% can be expected if Bell-state measurement can be realized.

For the measurement of Bell states, methods are normally adopted that employ detection circuits composed of photon detectors and linear-optical elements such as semitransparent mirrors and polarization beam splitters. However, such methods can discriminate only two of the four Bell states.

The Bell state of two photons can be represented in the framework of concept of the linear-optics by the following equations:

$$\Phi(\pm)=(|x>|x>\pm|y>|y>)/2^{1/2} \quad (1)$$

$$\Psi(\pm)=(|x>|y>\pm|y>|x>)/2^{1/2} \quad (2)$$

where $|x>$ and $|y>$ are the state functions for photons polarized in the directions of the x-axis and the y-axis, respectively.

As can be understood from equations (1) and (2), a Bell state is a superposed state of a two-photon state specified by a set of two directions of polarization and the state specified by the exchanged directions of polarization of two photons. $\Phi(\pm)$ are states in which the two photons polarize in the same direction, the state being symmetrical (+) or antisymmetrical (−) with respect to exchange of the directions of polarization; and $\Psi(\pm)$ are states in which the two photons polarize in orthogonal directions, the state being symmetrical (+) or antisymmetrical (−) with respect to the exchange of the direction of polarization.

FIG. 1 shows the configuration of an example of a Bell-state measurement circuit of the prior art that employs linear-optical elements.

The Bell-state measurement circuit is constituted by linear-optical elements including semitransparent mirror 51 and polarization beam splitters 52 and 53, and photon detectors 54, 55, 56, and 57. Polarization beam splitters 52 and 53 split incident polarized light into s-polarized light that oscillates in a direction perpendicular to the plane of incidence, and p-polarized light that oscillates within the plane of incidence. Photon detectors 54 and 55 detect s-polarized light and p-polarized light, respectively, emerging from polarization beam splitter 52. Photon detectors 56 and 57 detect the s-polarized light and p-polarized light, respectively, emerging from polarization beam splitter 53.

Polarized light of one of the four Bell states is incident on this Bell-state measurement circuit. The possible Bell states obtained from the response of photon detectors 54–57 are shown in Table 1.

As can be seen from Table 1, the Bell-state measurement circuit realized by the linear-optical elements shown in FIG. 1 can discriminate the $\Psi(\pm)$ states but cannot discriminate one of the $\Phi(\pm)$ states. Although it is known that the use of a quantum gate, referred to as a light-controlled NOT gate, enables all four Bell states to be discriminated, a practically realizable device of this type of quantum gate has still not been known.

TABLE 1

| detector that detects a photon | possible Bell state |
|---|---|
| 54 and 55 | Ψ (+) |
| 54 and 57 | Ψ (−) |
| 55 and 56 | Ψ (−) |
| 56 and 57 | Ψ (+) |
| any one of 54–57 | Φ (±) |

Scully M. O. et al. have recently proposed in Physical Review Letters 83, 4433 (1999) a method of measuring Bell states that employs two-photon absorption. In this method, the Bell states are specified in terms of circularly polarized light, the light is passed through three atomic cells to cause two-photon absorption, and the fluorescence emitted from the atomic cell caused by two-photon absorption is observed. The absorption of only one specific Bell state can be caused if the atoms in the cells are prepared in advance by a strong electromagnetic field such that the atomic wave function is represented in a special superposition of unperturbed atomic wave functions. The Bell state of the incident light can thus be determined by observing which cells absorb light. If two-photon absorption does not occur in any of the three cells, it can be concluded that the incident light was in the remaining one Bell state.

The two-photon absorption in the method of Scully et al. uses atoms that have been prepared in advance by a strong electromagnetic field such that their wave function has a specific superposed state. However, it is difficult to keep the state of the atoms in the prepared state in which a plurality of states are superposed. Moreover, the method of Scully et al. necessitates three cells containing the atoms that have been thus prepared. Furthermore, since the atoms are contained in the cells as a gas, the atoms have a low density and the probability of two-photon absorption is low. To obtain two-photon absorption with sufficiently high probability, the cells must be extremely long, and this renders the method impractical. Still further, since the probability of observing fluorescence from electrons that have been excited by two-photon absorption is also not high, there is a high probability of error in discriminating the Bell states when fluorescence can not be observed. Transmission of quantum states cannot be achieved with high fidelity if errors occur in discriminating the Bell states.

It is a principal object of the present invention to provide a practical quantum circuit capable of measuring Bell states using a material that absorbs photon pairs with sufficiently high probability and that does not require setup of atomic states by means of an external electromagnetic field in order to realize communication of quantum states with high fidelity.

SUMMARY OF THE INVENTION

The quantum circuit of the present invention is provided with: a two-photon absorbing crystal having the crystal symmetry selected so that the two-photon absorbing crystal selectively absorbs a photon pair of a prescribed Bell state in accordance with selection rules based on crystal symmetry; and a two-photon absorption detector that detects absorption of photon pairs by said two-photon absorbing crystal.

The quantum state of an incident optical signal is a state in which four Bell states are superposed or entangled and it is intended that one of the entangled four Bell states is discriminated by means of the two-photon absorption by the crystal having a crystal symmetry that permits two-photon absorption of a polarized photon pair in the Bell state to be discriminated.

If the two-photon absorbing crystal has crystal symmetry that permits two-photon absorption of a polarized photon pair in any one of a plurality of Bell states that correspond to degenerated final states of exciton production in said two-photon absorbing crystal, a perturbation field is applied to said crystal so that the two-photon absorbing crystal will selectively absorb the polarized photon pair in only one of the plurality of the Bell states.

Electrons that are excited by two-photon absorption are detected by the two-photon absorption detector. The use of polarization elements enables the one-to-one conversion of one Bell state to another Bell state. All of the Bell states can be discriminated by successively repeating the operations of: converting the Bell state of a photon pair that have been transmitted by a two-photon absorbing crystal, to another Bell state; directing this photon pair to another two-photon absorbing crystal; and detecting.

The quantum states of polarized light include the four Bell states Φ(+), Φ(−), Ψ(+), and Ψ(−).

Φ(+) is a state in which the directions of polarization of the photon pair are the same and that is symmetrical with respect to the exchange of the directions of polarization; Φ(−) is a state in which the directions of polarization of the photon pair are the same and that is antisymmetrical with respect to t he exchange of the directions of polarization; Ψ(+) is a state in which the directions of polarization of the photon pair are orthogonal and that is symmetrical with respect to the exchange of the directions of polarization; and Ψ(−) is a state in which the directions of polarization of the photon pair are orthogonal and that is antisymmetrical with respect to the exchange of the directions of polarization.

The above-described quantum circuit requires four two-photon absorbing crystals to discriminate the four Bell states Φ(+), Φ(−) Ψ(+) and Ψ(−). However, since two states Ψ(+) and Ψ(−) can be discriminated by using a prior-art quantum circuit as shown in FIG. 1 using linear-optical elements, it suffices for the Φ(+) state and Φ(−) state ( which cannot be discriminated by linear-optical elements), to be absorbed by two-photon absorbing crystals and detected, and for the remaining Ψ(+) and Ψ(−) states to be discriminated by linear-optical elements.

The quantum circuit to discriminate two Bell states such as Φ(+) and Φ(−) states is constituted by: a first two-photon absorbing crystal having the crystal symmetry selected so that the two-photon absorbing crystal selectively absorbs a photon pair of a first prescribed Bell state in accordance with selection rules based on crystal symmetry; a first two-photon absorption detector that detects absorption of photon pairs by the two-photon absorbing crystal; a second two-photon absorbing crystal having the crystal symmetry selected so that the two-photon absorbing crystal selectively absorbs a photon pair of a second prescribed Bell state in accordance with selection rules based on crystal symmetry; a second two-photon absorption detector for detecting the absorption of photon pairs by said second two-photon absorbing crystal; and a first polarization element that converts a first transmitted Bell state to the second prescribed Bell state.

Here the first transmitted Bell state is one of the possible Bell states of a polarized photon pair that have been transmitted by said first two-photon absorbing crystal.

As an embodiment of this quantum circuit, if the first and second two-photon absorbing crystals are both crystals that absorb the Φ(+) Bell state, the above-described first and second prescribed Bell states are both Φ(+). Then, if the first transmitted Bell state is Φ(−), a polarization element that converts Bell state Φ(−) to Bell state Φ(+) is used as the first polarization element. In this case, the first polarization element can be a retarder means that provides a 90° phase difference between the oscillations in polarization directions of each photon of the photon pair.

In this way, the discrimination of Bell states Φ(+) and Φ(−) from the incident polarized light is enabled.

As the polarization element, a retarder can be used that provides a 90° phase difference between the oscillations in polarization directions of each photon of the photon pair when converting from Bell state Φ(±) to Bell state Φ(∓). Conversion from Bell state Φ(±) to Bell state Ψ(∓) can also be realized by arranging an optical rotator of 90° rotation in one of the photon paths. The conversion from Ψ(±) to Ψ(∓) is achieved by retarders for providing a 90° phase difference between the oscillations in polarization directions of one of the photon pair and a −90° phase difference to the oscillations of the other photon.

Generally, the absorption of photons of Bell state Φ(−) is weaker than the absorption of photons of Bell state Φ(+), and the absorption of photons of Bell state Ψ(−) is weaker than the absorption of photons of Bell state Ψ(+). As a result, a crystal having a crystal symmetry that absorbs photons having Bell state Φ(+) or photons having Bell state Ψ(+) is used as the two-photon absorbing crystal.

Accordingly, polarization elements are also used that convert to Bell state Φ(+) or to Bell state Ψ(+).

According to the present invention, each of the four Bell states is discriminated by a different discrimination means, and as a result, even in the event of discrimination failures, the possibility of discriminating an incorrect Bell state is limited to failures caused by noise of the detectors and is therefore small. Bell-state discrimination can therefore be realized with a low level of error.

The discrimination of all Bell states in the present invention is thus realized by the discrimination of specific Bell states by quantum interference and polarization selection rules of two-photon absorption that are based on the symmetry of a crystal and by the conversion of Bell states by polarization elements; and there is consequently no need for preparations in advance such that the wave functions of an atom are employed with particular superposition.

In addition, strong two-photon absorption can be expected because a solid is used. As a result, a practical quantum circuit can be realized that can absorb photon pairs with sufficiently high probability and discriminate Bell states using a material that does not require the preparation of the state of an atom by an external electromagnetic field.

Although extremely rapid phase relaxation is normally a problem in quantum circuits that employ a solid material, the effect of phase relaxation is not a problem in the present invention because electrons that have been excited by two-photon absorption need not maintain coherence.

The above and other objects, features, and advantages of the present invention will become apparent from the following description referring to the accompanying drawings which illustrate examples of preferred embodiments of the present invention.

BRIEF DESCRIPTION OF THE DRAWINGS

FIG. 3 shows Clebsch-Gordan coefficients for two-photon absorption;

DETAILED DESCRIPTION OF THE PREFERRED EMBODIMENTS

Embodiments of the present invention are next explained with reference to the accompanying drawings.

Figure 2:
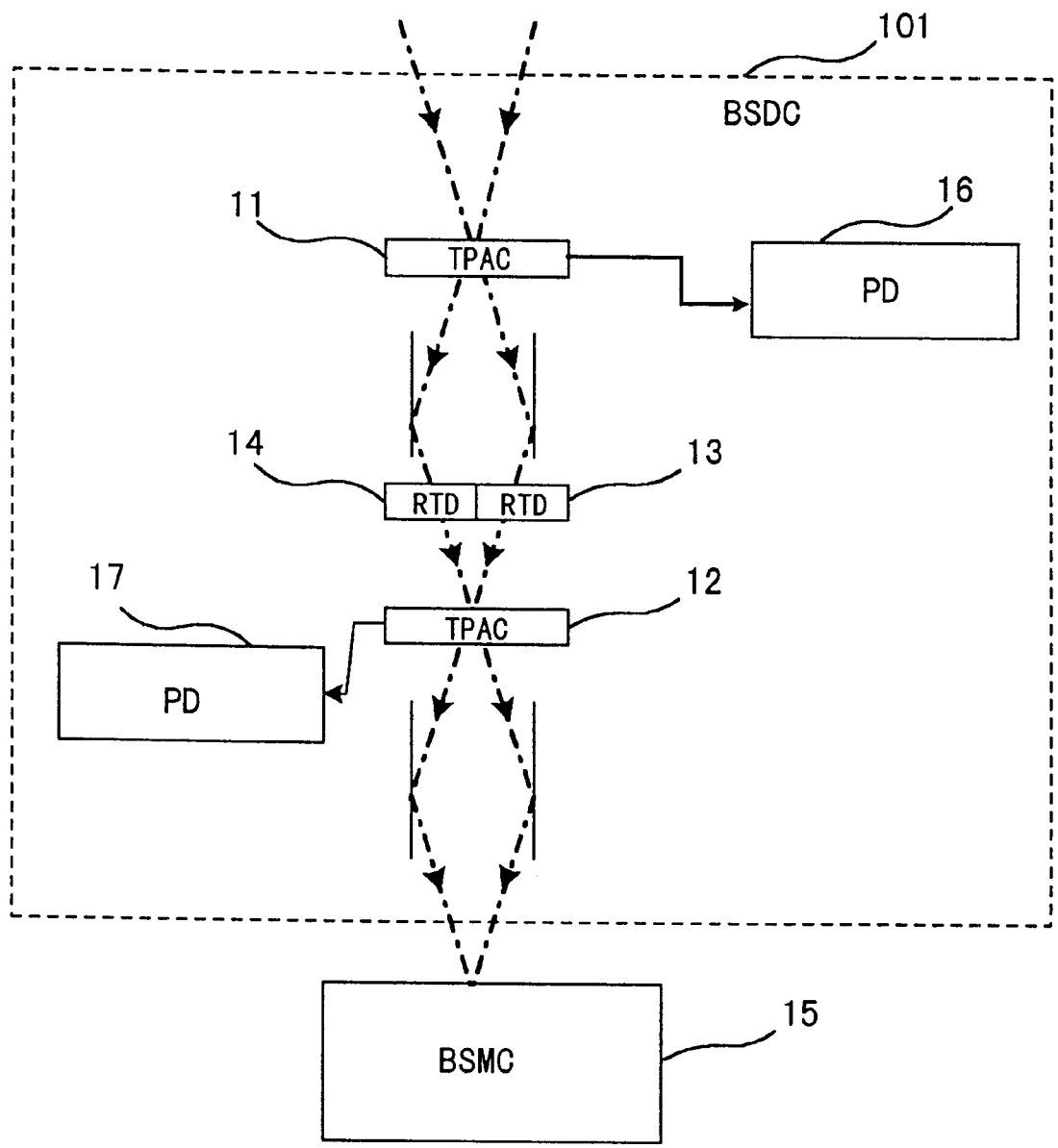
FIG. 2 is a structural view of a quantum circuit showing the first embodiment of the present invention.

FIG. 2 is a structural view of the first embodiment of a quantum circuit of the present invention.

The quantum circuit of this embodiment is provided with Bell-state discrimination circuit (BSDC) 101 and Bell-state measurement circuit (BSMC) 15. Bell-state discrimination circuit 101 is provided with: two-photon absorbing crystal (TPAC) 11, photoelectricity detector (PD) 16, retarders (RTD) 13 and 14, two-photon absorbing crystal 12, photoelectricity detector 17 (PD), and reflecting mirrors. The reflecting mirrors are used to deflect light beams in the direction of the optical axes of the optical system constituted by two-photon absorbing crystal 11, retarders 13 and 14, and two-photon absorbing crystal 12.

Two-photon absorbing crystals 11 and 12 employed in this embodiment are cubic crystals such as cuprous chloride (CuCl), which absorb photon pairs and generate exciton molecules inside the crystal. The exiton molecule is a hydrogen molecule-like compound of two excitons. The crystal thereby changes in electrical conductivity. Photoelectricity detectors 16 and 17 then detect change in the electric conductivity of two-photon absorbing crystals 11 and 12, respectively, and thus detect the occurrence of two-photon absorption from these detection results.

Figure 1:
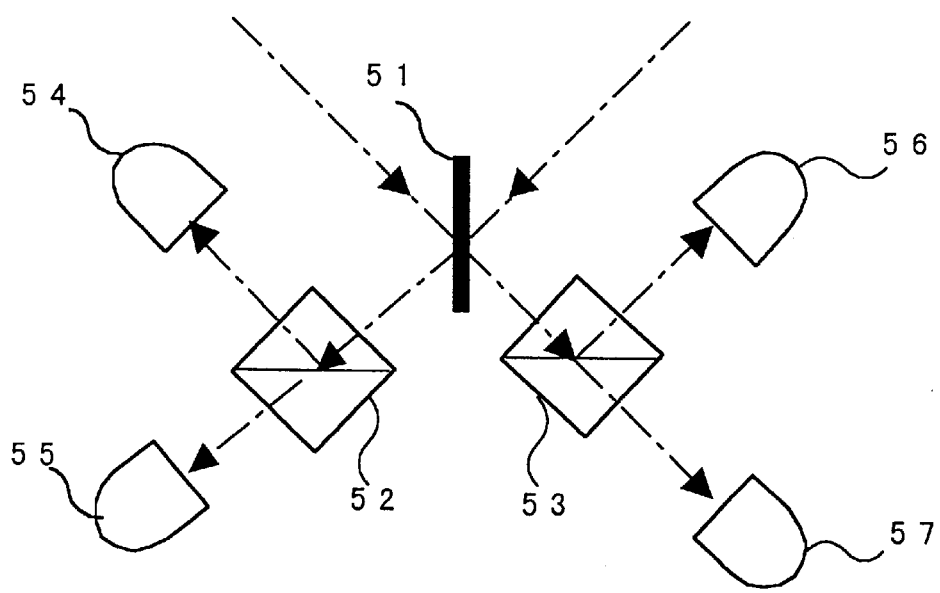
FIG. 1 is a structural view of a Bell-state measurement circuit of prior art.

As Bell-state measurement circuit 15 in this embodiment, the circuit of the prior art is employed that was explained with reference to FIG. 1.

Retarders 13 and 14 have their principal axes directed in the x and y directions, respectively, and provide a 90° phase difference to oscillations in the directions of the two principal axes. In this way, each retarder provides a 90° phase difference between the oscillations in polarization directions of each photon of the photon pair.

Incident light is set to resonate with two-photon absorption that causes generation of exciton molecules. Incident light is further set to be substantially perpendicular to the crystal surface (a perpendicular incidence). It is assumed in the preferred embodiments described in this Specification that the direction of incidence is directed substantially to the z-axis.

Polarized light in an entangled Bell state is incident on two-photon absorbing crystal 11. Light transmitted by two-photon absorbing crystal 11 passes through retarders 13 and 14, and a 90° phase difference is caused in oscillation in the directions of two principal axes, i.e., the x and y directions. The light is then directed into two-photon absorbing crystal 12, which has the same crystal structure as crystal 11. The photon state of light that has been transmitted by two-photon absorbing crystal 12 is discriminated by Bell-state measurement circuit 15 constituted by linear-optical elements.

The exciton molecules created by two-photon absorption are thermally ionized at room temperature. The electric currents caused by the ionization are detected as photoelectric signals by photoelectricity detectors 16 and 17.

The exciton molecule created in a cubic crystal such as cuprous chloride (CuCl) has a total symmetry ($\Gamma$1), and as a result, the incidence of two linearly-polarized photons results in two-photon absorption when the directions of polarization of the incident polarized photons are parallel. Accordingly, the photon pair must be in the $|x\rangle|x\rangle$ state or the $|y\rangle|y\rangle$ state in order for two-photon absorption to occur. Of the Bell states, two-photon absorption does not occur in the $\Psi(\pm)$ states in which the two photons have differing directions of polarization.

When a photon pair of the $\Phi(+)$ state is incident, absorption resulting from $|x\rangle|x\rangle$ and $|y\rangle|y\rangle$ reinforce each other, but when the $\Phi(-)$ state is incident, absorption caused by $|x\rangle|x\rangle$ and $|y\rangle|y\rangle$ cancel each other through quantum interference. As a result, only the $\Phi(+)$ state is detected through two-photon absorption by the two-photon absorbing crystal employed in this embodiment. A photon pair of the $\Phi(-)$ state transmitted through two-photon absorbing crystal 11 are converted to the $\Phi(+)$ by retarders 13 and 14, while the $\Psi(\pm)$ states remain unconverted.

When the outputs of retarders 13 and 14 are incident on two-photon absorbing crystal 12 having the same crystal structure as crystal 11, the Bell component $\Phi(+)$ that has been converted from the $\Phi(-)$ state experiences two-photon absorption. As a result, light that has not been absorbed by two-photon absorbing crystal 12 is only the light in the $\Psi(\pm)$ states. Polarized light in the $\Psi(\pm)$ states is discriminated by Bell-state measurement circuit 15 described above. Thus, all four of the Bell states can be detected by the procedures described hereinabove.

As the final state of two-photon absorption in a crystal having cubic symmetry, the possible electron states include states having $\Gamma$3 and $\Gamma$5 symmetries in addition to the state of total symmetry $\Gamma$1. These states are electron states of exciton molecules in a crystal such that the symmetry of the wave function of electrons occupying the highest energy level in the valence band is $\Gamma$8, as is the case with copper bromide (CuBr). In addition, the electron state of an exciton (an exciton that exists singly without forming an exciton molecule) that is created in a crystal having cubic symmetry have $\Gamma$5 symmetry. The polarization selection rule of two-photon absorption can be known from the Clebsch-Gordan coefficients shown in FIG. 3.

In FIG. 3, the notation $\Gamma$3 for example denotes the symmetry of the eigenfunction of the final state in two-photon absorption. The notation xy is the probability amplitude or eigenfunction of an exciton molecule created through x- and y-polarized two photon absorption.

In FIG. 3, only the superposition (quantum interference) of the polarized photons corresponding to coefficients of not 0 contributes to two-photon absorption. If the signs of the coefficients are the same, the Bell state that is symmetrical with respect to exchange of polarization directions undergoes two-photon absorption. If the signs of the coefficients are opposite, the Bell state that is antisymmetrical with respect to exchange of the polarization directions undergoes two-photon absorption.

Figure 4:
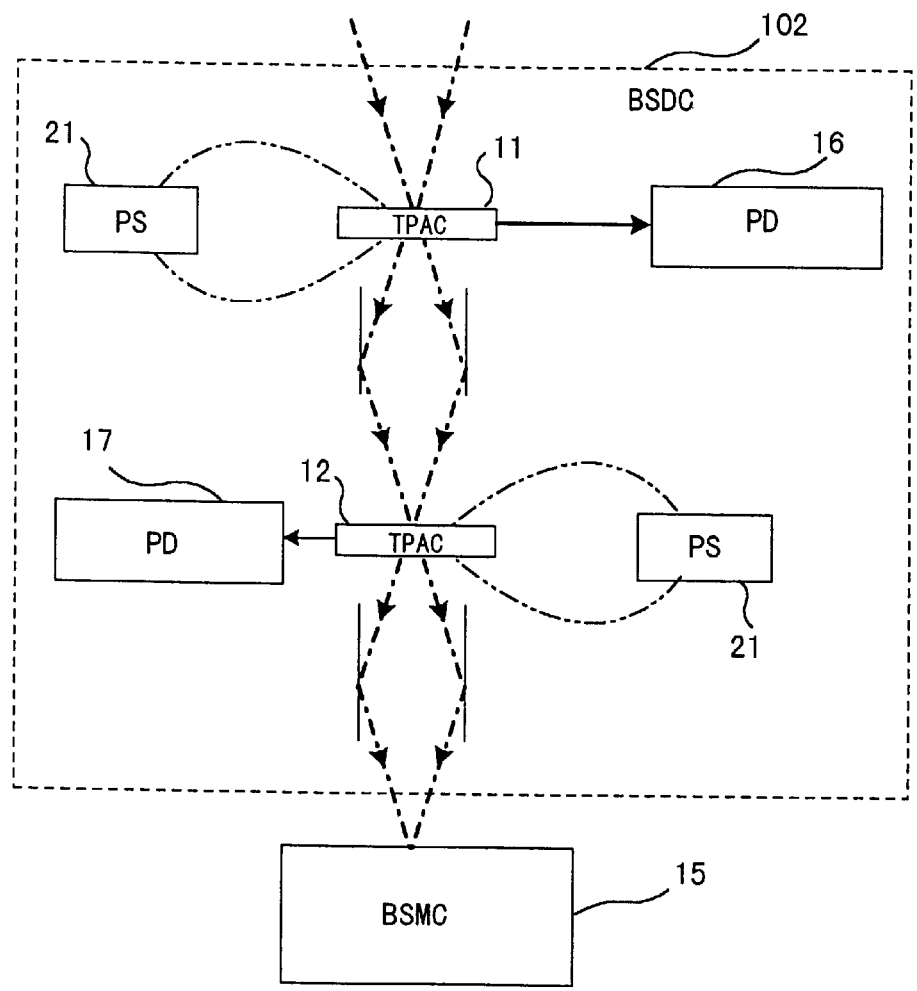
FIG. 4 is a structural view of a quantum circuit showing the second embodiment of the present invention.

FIG. 4 is a block diagram showing the configuration of the second embodiment of the present invention. Referring to FIG. 4, elements identified by the same reference numerals as FIG. 2 are elements having the same function as the corresponding elements in FIG. 2.

In the case that an employed crystal has crystal symmetry in which the final state of two-photon absorption has $\Gamma$3 symmetry, it is not necessarily required to use polarization elements such as retarders to alter the Bell state. FIG. 4 shows a quantum circuit for such a case.

The two degenerated state of exciton molecules having $\Gamma$3 symmetry can be split into two non-degenerated states by applying uniaxial stress to the two-photon absorbing crystal or by forming a quantum well in the two-photon absorbing crystal.

As can be understood from FIG. 3, one of the states having $\Gamma$3 symmetry (the upper row of $\Gamma$3 state in FIG. 3) is a final state created through absorption of two photons in the $\Phi(+)$ state, and the other state (the lower row $\Gamma$3 state in FIG. 3) is a final state created through absorption of two photons in the $\Phi(-)$ state.

Although these two states have equal energy (energy degeneration), applying a perturbation field of tetragonal symmetry such as a quantum well to lower the crystal symmetry can separate their energy level.

Alternatively, only one of the two degenerated states can be set to resonate with the two-photon absorption of incident light by, for example, applying an electric field to the two-photon absorbing crystal. Thus, instead of using retarders in this embodiment, power supply (PS) 21 is provided to apply an electric field to each of the two-photon absorbing crystals to separate the degenerated energy levels of the exciton molecule.

By preparing a crystal so that degenerated energy levels of exciton molecule states are separated so as to have one of the states resonate with two-photon absorption, and by using two crystals prepared in this manner, absorption of two photons either in the $\Phi(+)$ state or in the $\Phi(-)$ state can be made by each of the two crystals.

Figure 5:
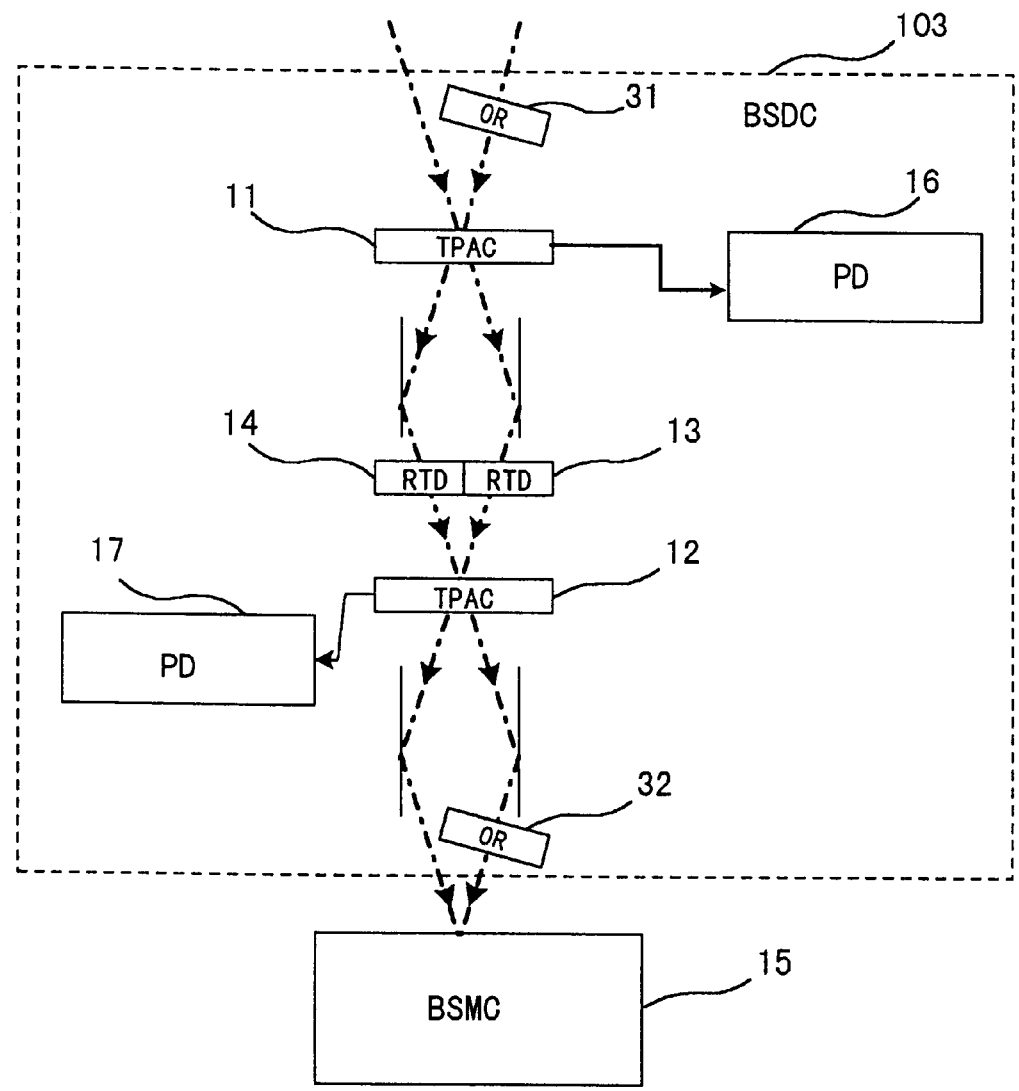
FIG. 5 is a structural view of a quantum circuit showing the third embodiment of the present invention.

Next, FIG. 5 shows a block diagram of a third embodiment of the present invention illustrating a configuration of a quantum circuit.

In this embodiment, the two-photon absorbing crystal has crystal symmetry in which the final state of two-photon absorption has the $\Gamma$5 symmetry. Optical rotator (OR) 31 for rotating polarized light 90° is inserted in one of the optical paths before incidence to two-photon absorbing crystal 11.

One of the light beams transmitted by two-photon absorbing crystal 11 passes through retarder 13, which provides a 90° phase difference to oscillations in the directions of the two principal axes; and the other beam of light passes through retarder 14, which provides a −90° phase difference to oscillations in the direction of the two principal axes. In this embodiment, the two principal axes are directed to the x and y directions.

Light that has passed through retarders 13 and 14 then passes through two-photon absorbing crystal 12, which has the same crystal structure as two-photon absorbing crystal 11. Optical rotator 32 for rotating polarized light −90° is inserted in one of the optical paths of light that has passed through two-photon absorbing crystal 12. The state of the photons is then discriminated by Bell-state measurement circuit (BSMC) 15, which is constituted by linear-optical elements When the final state of two-photon absorption has $\Gamma$5 symmetry, only the $\Psi(+)$ state is selected for two-photon absorption (see the third row of $\Gamma$5 symmetry in FIG. 3). Of the Bell states, optical rotator 31 converts the $\Phi(-)$ state to the $\Psi(+)$ state. At this time, the $\Phi(+)$ state is converted to the $\Psi(-)$ state, and the $\Psi(\pm)$ states are converted to the $\Phi(\mp)$, respectively.

When light of these Bell states is incident to two-photon absorbing crystal 11, only light that has been converted from the Φ(−) state to the Ψ(+) state is absorbed through two-photon absorption. In this way, of the Bell states of the incident polarized light, the Φ(−) state is first detected.

The Ψ(−) state is next converted to the Ψ(+) state by retarders 13 and 14, but the Φ(±) states are not converted by retarders 13 and 14. Accordingly, only photons currently in the Ψ(+) state (light that was in the Φ(+) state before incidence to optical rotator 31) undergo two-photon absorption in two-photon absorbing crystal 12. Thus, of the Bell states of the incident polarized light, the Φ(+) state is detected by two-photon absorbing crystal 12.

The Bell state that has been converted to the Φ(∓) states by optical rotator 31 is then returned to the original Ψ(+) states by optical rotator 32. These Ψ(±) states are discriminated by Bell-state measurement circuit (BSMC) 15, which is constituted by linear-optical elements.

In FIG. 5, as in FIG. 4, retarders 13 and 14 can be omitted by making two-photon absorbing crystal 11 absorb Φ(+) photon pairs and two-photon absorbing crystal 12 absorb Φ(−) photon pairs.

Next, a fourth embodiment of the present invention will be explained.

Although, in the previously described circuit, the Ψ(±) states were discriminated by Bell-state measurement circuit 15 which is constituted by linear-optical elements, it is also possible to convert the Bell states Ψ(±) by means of retarders or optical rotators and detect all four Bell states by two-photon absorbing crystals.

Figure 6:
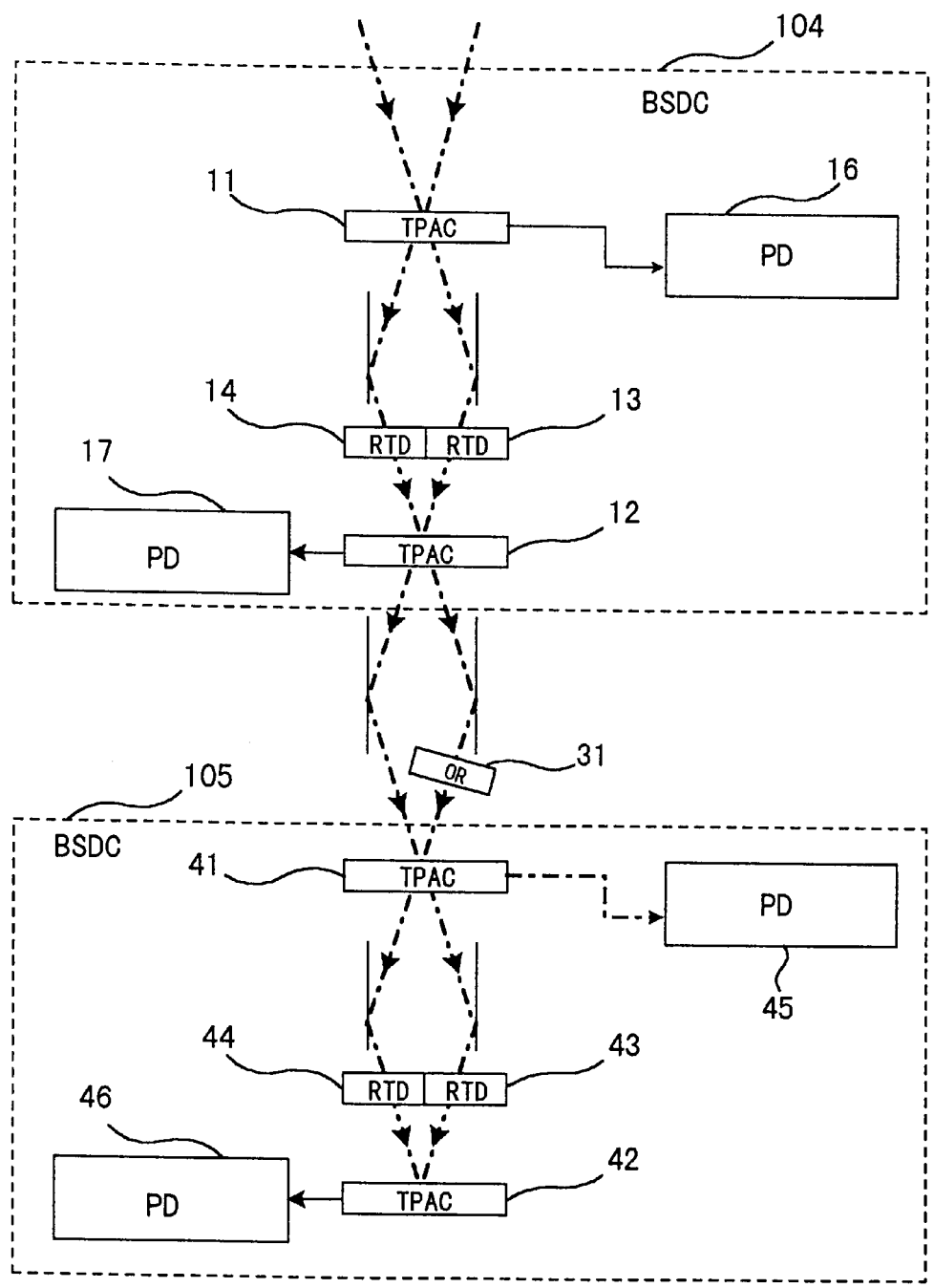
FIG. 6 is a structural view of a quantum circuit showing the fourth embodiment of the present invention.

FIG. 6 shows the configuration of an embodiment of a quantum circuit when using crystals having crystal symmetry in which the final state of two-photon absorption has Γ1 symmetry.

In the quantum circuit of this embodiment, a configuration is adopted in which two Bell-state discrimination circuits (BSDC) 104 and 105 having the same arrangement as Bell-state discrimination circuit 101 of the first embodiment are arranged in series with optical axes aligned on a single line and optical rotator 31 inserted between the two discrimination circuits 104 and 105.

Bell-state discrimination circuit 104 detects Bell states Φ(+) and Φ(−), similarly to Bell-state discrimination circuit 101 of the first embodiment.

Bell-state discrimination circuit 105, however, together with preposed optical rotator 31 , detects Ψ(+) and Ψ(−) as described hereinbelow.

Optical rotator 31, which is inserted in one of the optical paths of light transmitted by two-photon absorbing crystal 12, rotates polarized light 90°. Bell states Ψ(+) and Ψ(−) are consequently converted to Bell states Φ(−) and Φ(+), respectively. When photon pairs entangled with these Bell states are incident to two-photon absorbing crystal 41, only the Φ(+) state experiences two-photon absorption. Since this Φ(+) state was originally (when incident to Bell-state discrimination circuit 104) Bell state Ψ(−), the Ψ(−) state is discriminated by detecting the photoelectricity conductivity of two-photon absorbing crystal 41.

A photon pair of the Φ(−) state that have been transmitted by two-photon absorbing crystal 41 pass through retarders 43 and 44 and are converted to Bell state Φ(+) The retarders give a 90° phase difference to oscillations in the directions of the two principal axes, as described above. In this embodiment, the principal axes are directed to the x and y directions.

This polarized light of Bell state Φ(+) is incident to two-photon absorbing crystal 42 and absorbed.

In this way, the original Ψ(+) Bell state is discriminated by detecting the photoelectricity conductivity of two-photon absorbing crystal 42.

Each of the different Bell states is thus discriminated by four two-photon absorbing crystals 11, 12, 41, and 42.

Although the embodiment of FIG. 6 is an example in which Ad the final-state symmetry is Γ1, all Bell states can be similarly detected in cases in which the final state has different symmetry.

Although Bell-state discrimination circuits 104 and 105 in FIG. 6 are identical to Bell-state discrimination circuit 101 of FIG. 2, these circuits may be replaced by Bell-state discrimination circuit 102 of FIG. 4 or Bell-state discrimination circuit 103 of FIG. 5. In a case in which Bell-state discrimination circuits 104 and 105 are replaced with Bell-state discrimination circuit 102 of FIG. 4, retarders 13 and 14 can be omitted by the same method as the quantum circuit of FIG. 4 in which two-photon absorbing crystal 11 absorbs photon pairs of the Φ(+) state and two-photon absorbing crystal 12 absorbs photon pairs of the Φ(−) state.

Although two-photon absorbing crystals in the foregoing explanation are cubic crystals, similar selection rules hold true for hexagonal crystals or tetragonal crystals when the direction of incident light is substantially parallel to the c-axis, and thus these crystals may also be used in the quantum circuit of the present invention. For example, II–VI group compounds such as zinc oxide (ZnO), zinc selenide (ZnSe), and cadmium sulfide (CdS) can also be considered. Even in the case of the existence of a quantum well or quantum box that confines electrons, the structure can be used if the structure maintains a prescribed symmetry. Organic compounds such as polyphilene may also be used.

A marked increase in the probability of two-photon absorption can be realized by inserting a two-photon absorbing crystal inside a structure in which light is confined within a narrow range to increase the electric field intensity.

Figure 7:
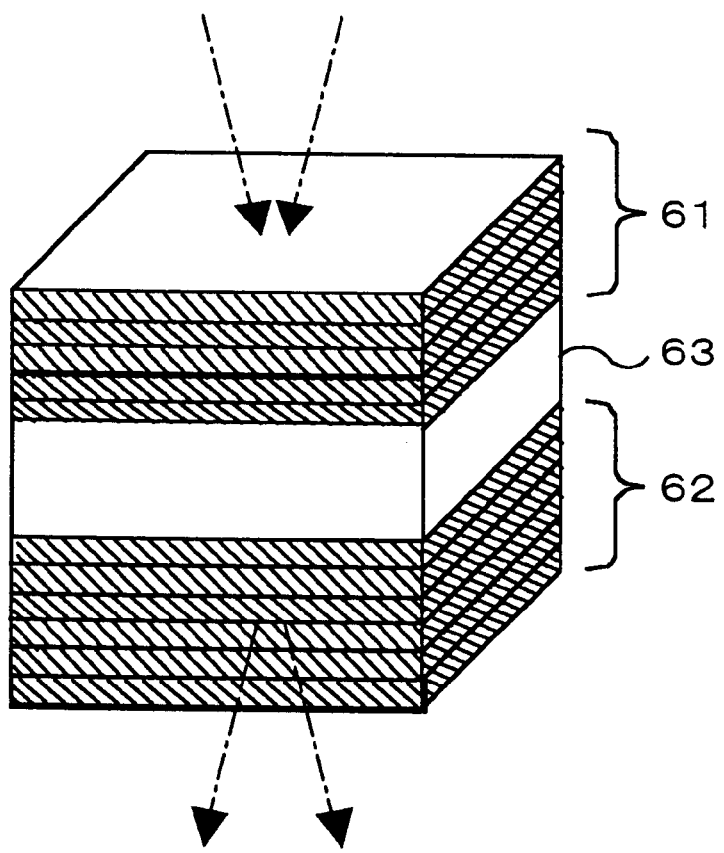
FIG. 7 is a structural view of one example of the resonator with inserted two-photon absorbing crystal.

One example of this type of structure is a Fabry-Perot resonator structure as shown in FIG. 7: layer 63 including a two-photon absorbing crystal of one wavelength in thickness is sandwiched between multilayer mirrors 61 and 62 made up of alternately stacked two different types of semiconductor or dielectric. The incidence of light is substantially perpendicular to the reflecting mirrors. In order to separate the two transmitted light beams, the angle of incidence must be greater than 0°.

In this type of resonator, light is confined to approximately $10\,\mu m^3$. In addition, the photon lifetime (the time that photons remain inside the resonator) is of the order of 10 ps. The intensity of the field that is produced inside the resonator by two photons in a Bell state is of the order of 104 V/m, wherein the refractive index of the layer that includes a two-photon absorbing crystal is assumed to be of the order of 3.

If cuprous chloride (CuCl) is used as the two-photon absorbing crystal, the two-photon absorption coefficient has a large value of 0.1 cm/W due to the giant two-photon absorption by exciton molecules. The speed of two-photon absorption inside the resonator reaches 0.1 $ps^{-1}$, whereby two-photon absorption occurs once during the photon lifetime and Bell states can be detected.

The structure of the resonator is not limited to a Fabry-Perot resonator. It is also possible to use a defect portion produced by disrupting periodicity in one portion of a photonic crystal: a photonic crystal is constituted by alternately arranging two or more substances having different dielectric constants at a period of the order of the wavelength of light.

A resonator realized by such a photonic crystal can confine light in a smaller volume than a Fabry-Perot resonator and also can extend the photon lifetime. Therefore, it allows a further increase in the probability of Bell-state detection.

It is also possible to raise the intensity of the electric field of light by means of a waveguide without using a resonator. Of course, a structure for confining light is not necessary if the two-photon absorption coefficient of a two-photon absorbing crystal is sufficiently large.

The present invention can finally be summarized as follows:

A specific Bell state is discriminated by using a two-photon absorbing crystal that absorbs a polarized photon pair of a specific Bell state in accordance with a selection rule based on the symmetry of the crystal; by using a polarization element, any Bell state of incident light can be converted to the specific Bell state to take part in the two-photon absorption by the concerned crystal; and thus alternate arrangement of a two-photon absorbing crystal and a polarization element makes it possible to discriminate any number of Bell states one by one.

A practical quantum circuit capable of discriminating a Bell state is thus provided without providing perturbation to atoms such as an external electromagnetic field in order to cause two-photon absorption of a specific Bell state, as is the case with a quantum circuit of the prior art.

The use of a crystal instead of a gas allows to intensify the two-photon absorption, thereby enabling detection of a Bell state with sufficiently high probability. In addition, by enabling the individual detection of the four Bell states, errors due to detection failures can be suppressed to a low level.

Finally, the present invention is not limited to the above-described embodiments, and each embodiment can obviously be modified as appropriate within the technological scope of the following claims.

What is claimed is:

1. A quantum circuit for detecting a quantum state of an optical signal, wherein said quantum state is a Bell state of a polarized photon pair, the directions of polarization of two photons that make up said polarized photon pair being in a fixed relation to each other, and wherein said Bell state of a photon pair is a superposition of the states of said photon pair, each of said states of said photon pair being designated with reference to a set of directions of polarization of individual photons, said quantum circuit comprising:

a two-photon absorbing crystal having the crystal symmetry selected so that the two-photon absorbing crystal selectively absorbs a photon pair of a prescribed Bell state in accordance with selection rules based on crystal symmetry; and a two-photon absorption detector that detects absorption of photon pairs by said two-photon absorbing crystal.

2. A quantum circuit according to claim 1 wherein said quantum state of an incident optical signal is a state in which four Bell states are superposed; and said two-photon absorbing crystal has a crystal symmetry selected to make two-photon absorption of a polarized photon pair in at least one Bell state of said incident optical signal.

3. A quantum circuit according to claim 2 wherein, in a case in which said two-photon absorbing crystal has the crystal symmetry that permits two-photon absorption of a polarized photon pair in any one of a plurality of Bell states that correspond to degenerated final states of exciton production in said two-photon absorbing crystal, a perturbation field is provided to said crystal so that said two-photon absorbing crystal will selectively absorb said polarized photon pair in only one of said plurality of said Bell states.

4. A quantum circuit according to claim 3 wherein a two-photon absorbing crystal has a quantum well, or is applied with uniaxial stress or an electric field.

5. A quantum circuit according to claim 2 further provided with a resonator that resonates with an incident optical signal for accommodating said two-photon absorbing crystal.

6. A quantum circuit according to claim 2, wherein said two-photon absorbing crystal is designated as a first two-photon absorbing crystal; said two-photon absorption detector is designated as a first two-photon absorption detector; and, of the four Bell states of said incident optical signal, the Bell state of a polarized photon pair that is absorbed by said first two-photon absorbing crystal is designated as a first prescribed Bell state; said quantum circuit further comprising:

a second two-photon absorbing crystal having the crystal symmetry selected so that said second two-photon absorbing crystal selectively absorbs a photon pair of a second prescribed Bell state in accordance with selection rules based on crystal symmetry;

a second two-photon absorption detector for detecting the absorption of photon pairs by said second two-photon absorbing crystal; and a first polarization element that converts a first transmitted Bell state to said second prescribed Bell state, wherein said first transmitted Bell state is one of the possible Bell states of a polarized photon pair that have been transmitted by said first two-photon absorbing crystal.

7. A quantum circuit according to claim 6 further comprising:

a third two-photon absorbing crystal having the crystal symmetry selected so that the two-photon absorbing crystal selectively absorbs a photon pair of a third prescribed Bell state in accordance with selection rules based on crystal symmetry;

a third two-photon absorption detector for detecting the absorption of photon pairs by said third two-photon absorbing crystal; and a second polarization element that converts the second transmitted Bell state to said third prescribed Bell state, wherein said second transmitted Bell state is one of the possible Bell states of a polarized photon pair that have been transmitted by said second two-photon absorbing crystal.

8. A quantum circuit according to claim 7, further comprising:

a fourth two-photon absorbing crystal having the crystal symmetry selected so that the two-photon absorbing crystal selectively absorbs a photon pair of a fourth prescribed Bell state in accordance with selection rules based on crystal symmetry;

a fourth two-photon absorption detector for detecting the absorption of photon pairs by said fourth two-photon absorbing crystal; and a third polarization element that converts a third transmitted Bell state to said fourth prescribed Bell state, wherein said third transmitted Bell state is a possible Bell state of a polarized photon pair that have been transmitted by said third two-photon absorbing crystal.

9. A quantum circuit according to claim 6 wherein said first two-photon absorbing crystal and said second two-photon absorbing crystal have the same crystal structure.

10. A quantum circuit according to claim 8 wherein said third two-photon absorbing crystal and said fourth two-photon absorbing crystal have the same crystal structure.

11. A quantum circuit according to claim 9 where said third two-photon absorbing crystal and said fourth two-photon absorbing crystal have the same crystal structure as the crystal structure of said first two-photon absorbing crystal.

12. A quantum circuit according to claim 9 wherein:
said first prescribed Bell state is a state Φ(+) in which the directions of polarization of the photon pair are the same and that is symmetrical with respect to exchange of the directions of polarization; and
said first polarization element has a function of converting the Bell state Φ(−) to the Bell state Φ(+), said Bell state Φ(−) being a state in which the directions of polarization of the photon pair are the same and that is antisymmetrical with respect to exchange of the directions of polarization.

13. A quantum circuit according to claim 11 wherein:
said first prescribed Bell state is a state Φ(+) in which the directions of polarization of the photon pair are the same and that is symmetrical with respect to exchange of the directions of polarization,
said first polarization element is a retarder means for providing a 90° phase difference between the oscillations in polarization directions of each photon of the photon pair; and
said second polarization element is an optical rotator that rotates the direction of polarization of one of the photon pair 90°, and
said third polarization element is a retarder means that provides a 90° phase difference between the oscillations in polarization directions of each photon of the photon pair.

14. A quantum circuit that discriminates Bell states Φ(+) and Φ(−) from polarized photon pairs entangled to four Bell states Φ(+), Φ(−), Ψ(+), and Ψ(−) by using crystals that selectively absorb only a polarized photon pair of a Bell state Ψ(+); comprising:
an optical rotator that rotates the direction of polarization of one of the incident polarized optical signals 90°;
a first two-photon absorbing crystal that receives the output of said optical rotator and the other of said incident polarized optical signals, and selectively absorbs a polarized photon pair in Bell state Ψ(+) only;
a first two-photon absorption detector that detects the absorption of photon pairs by said first two-photon absorbing crystal;
a retarder means that provides a 90° phase difference between the oscillations in polarization directions of one of the photons of said photon pair that have been transmitted by said first two-photon absorbing crystal and provides a −90° phase difference between the oscillations in polarization directions of the other photon of said photon pair;
a second two-photon absorbing crystal that receives the output of said retarder means, and selectively absorbs a polarized photon pair of Bell state Ψ(+) only; and
a second two-photon absorption detector that detects the absorption of photons pairs by said second two-photon absorbing crystal;

wherein Φ(+) is a state in which the directions of polarization of the polarized photon pair are the same and that is symmetrical with respect to the exchange of the directions of polarization; Φ(−) is a state in which the directions of polarization of a polarized photon pair are the same and that is antisymmetrical with respect to the exchange of the directions of polarization; Ψ(+) is a state in which the directions of polarization of a polarized photon pair are orthogonal and that is symmetrical with respect to the exchange of the directions of polarization; and Ψ(−) is a state in which the directions of polarization of a polarized photon pair are orthogonal and that is antisymmetrical with respect to the exchange of the directions of polarization.

15. A quantum circuit for discriminating specific Bell states from polarized optical signal in an entangled state of four Bell states, each Bell state representing a quantum state of a polarized photon pair, said quantum circuit comprising:
a first two-photon absorbing crystal having the crystal symmetry that permits to absorb a polarized photon pair in either of two Bell states in accordance with selection rules based on crystal symmetry;
a first power supply that supplies voltage to said first two-photon absorbing crystal such that said first two-photon absorbing crystal selectively absorbs a polarized photon pair in a first Bell state of said two Bell states only;
a first two-photon absorption detector that detects the absorption of a polarized photon pair by said first two-photon absorbing crystal;
a second two-photon absorbing crystal having the same crystal structure as said first two-photon absorbing crystal;
a second power supply that supplies a voltage to said second two-photon absorbing crystal such that said second two-photon absorbing crystal selectively absorbs a polarized photon pair in a second Bell state of said two Bell states only; and
a second two-photon absorption detector that detects the absorption of photon pairs by said second two-photon absorbing crystal.

* * * * *